United States Patent
Johnson et al.

(10) Patent No.: US 11,182,632 B1
(45) Date of Patent: Nov. 23, 2021

(54) METHODS AND SYSTEMS INCLUDING AN EDGE DEVICE CAMERA CONFIGURED TO CAPTURE VARIABLE IMAGE DATA AMOUNTS FOR AUDITED SHOPPING AND RELATED COMPUTER PROGRAM PRODUCTS

(71) Applicant: Toshiba Global Commerce Solutions Holdings Corporation, Tokyo (JP)

(72) Inventors: Brad M. Johnson, Raleigh, NC (US); Adrian Rodriguez, Durham, NC (US); David Steiner, Durham, NC (US); Neil Girard, Pittsboro, NC (US)

(73) Assignee: Toshiba Global Commerce Solutions Holdings Corporation

( * ) Notice: Subject to any disclaimer, the term of this patent is extended or adjusted under 35 U.S.C. 154(b) by 0 days.

(21) Appl. No.: 17/002,612

(22) Filed: Aug. 25, 2020

(51) Int. Cl.
| | | |
|---|---|---|
| *G06K 9/20* | (2006.01) | |
| *G06K 9/00* | (2006.01) | |
| *H04N 7/18* | (2006.01) | |
| *G06Q 30/06* | (2012.01) | |
| *H04N 5/232* | (2006.01) | |
| *G06Q 10/08* | (2012.01) | |

(Continued)

(52) U.S. Cl.
CPC ......... *G06K 9/209* (2013.01); *G06K 9/00771* (2013.01); *G06K 9/2027* (2013.01); *G06Q 10/087* (2013.01); *G06Q 30/0201* (2013.01); *G06Q 30/0633* (2013.01); *H04N 5/23229* (2013.01); *H04N 5/23245* (2013.01); *H04N 5/247* (2013.01); *H04N 7/188* (2013.01)

(58) Field of Classification Search
CPC .. G06K 9/209; G06K 9/2027; G06K 9/00771; G06Q 10/087; G06Q 30/0201; H04N 5/23245; H04N 5/247; H04N 7/188; H04N 5/23229
See application file for complete search history.

(56) References Cited

U.S. PATENT DOCUMENTS

| | | | |
|---|---|---|---|
| 6,592,033 | B2 | 7/2003 | Jennings et al. |
| 6,636,635 | B2 | 10/2003 | Matsugu |
| 7,253,832 | B2 | 8/2007 | Iwaki et al. |

(Continued)

OTHER PUBLICATIONS

Inoue et al.; *Adaptive Frame-Rate Optimization for Energy-Efficient Object Tracking*; Int'l Conf. IP, Comp. Vision and Pattern Recognition (2016); pp. 158-164.

*Primary Examiner* — Farzana Hossain
(74) *Attorney, Agent, or Firm* — Stanek Lemon Crouse & Meeks, P.A.

(57) ABSTRACT

A method of identifying an item as part of audited shopping can be provided by operating an edge device camera using a first operating parameter, detecting activity indicating a purchase of an item with view of the edge device camera, capture first image data for the item responsive to detecting the activity, processing the first image data to determine a shape of the item as viewed by the edge device camera, operating the edge device camera using a second operating parameter to capture second image data for the item that is greater than the first image data, responsive to determining that the shape of the item limits an accurate identification of the item using the first image data, processing the second image data to identify the item to provide an identified item, and operating the edge device camera using the first operating parameter.

20 Claims, 6 Drawing Sheets

(51) Int. Cl.
*G06Q 30/02* (2012.01)
*H04N 5/247* (2006.01)

(56) References Cited

U.S. PATENT DOCUMENTS

| | | | |
|---|---|---|---|
| 8,100,552 B2 | 1/2012 | Spero | |
| 8,538,820 B1* | 9/2013 | Migdal | G06Q 20/20 |
| | | | 705/16 |
| 9,282,297 B2 | 3/2016 | Siann et al. | |
| 9,355,123 B2 | 5/2016 | Wnuk et al. | |
| 9,367,770 B2 | 6/2016 | Footen | |
| 9,584,710 B2 | 2/2017 | Marman et al. | |
| 2003/0024982 A1* | 2/2003 | Bellis, Jr. | G08B 13/246 |
| | | | 235/383 |
| 2010/0059589 A1* | 3/2010 | Goncalves | G06K 5/00 |
| | | | 235/383 |
| 2016/0006914 A1 | 1/2016 | Neumann | |
| 2016/0217387 A1* | 7/2016 | Okanohara | G06N 20/00 |
| 2019/0057438 A1* | 2/2019 | Dhankhar | G06Q 30/0641 |

\* cited by examiner

METHODS AND SYSTEMS INCLUDING AN EDGE DEVICE CAMERA CONFIGURED TO CAPTURE VARIABLE IMAGE DATA AMOUNTS FOR AUDITED SHOPPING AND RELATED COMPUTER PROGRAM PRODUCTS

FIELD

The present invention relates to the field of imaging systems in general, and more particularly, to imaging systems for audited shopping.

BACKGROUND

It is known to use in-store cameras to audit shoppers as part of what is referred to as "frictionless shopping." Some camera-based auditing systems transmit image data to remote cloud based systems for processing.

SUMMARY

Embodiments according to the invention can provide methods and systems including an edge device camera configured to capture variable image data amounts for audited shopping and related computer program products. Pursuant to these embodiments, a method of identifying an item as part of audited shopping can be provided by operating an edge device camera using a first operating parameter, detecting activity indicating a purchase of an item with view of the edge device camera, capture first image data for the item responsive to detecting the activity, processing the first image data to determine a shape of the item as viewed by the edge device camera, operating the edge device camera using a second operating parameter to capture second image data for the item that is greater than the first image data, responsive to determining that the shape of the item limits an accurate identification of the item using the first image data, processing the second image data to identify the item to provide an identified item, and operating the edge device camera using the first operating parameter.

In some embodiments according to the invention, an audited shopping system configured to identify an item can include an edge device camera positioned in-store and configured to capture images of an item, responsive to detecting activity indicating a purchase of the item. A processor circuit can be operatively closely-coupled to the edge device camera and configured to operate the edge device camera using a first operating parameter to capture first image data of the item during the activity and configured to process the first image data to determine a shape of the item as viewed by the edge device camera to determine whether the shape of the item limits an accurate identification of the item from the first image data. The processor circuit can be configured to operate the edge device camera using a second operating parameter to capture second image data of the item during the activity, the second image data being greater than the first image data, responsive to determining that the shape of the item limits the accurate identification of the item from the first image data. The processor circuit can be configured to process the second image data to identify the item to provide an identified item and the processor circuit can be configured to operate the edge device camera using the first operating parameter.

In some embodiments according to the invention, a method of identifying an item as part of auditing shopping can be provided by operating an edge device camera using a low frame rate to capture a lower quantity of image data for an item to determine the shape of the item, determining that the shape of the item limits an accurate identification of the item to complete a purchase using the lower quantity of image data and then operating the edge device camera using a high frame rate to provide a higher quantity of image data to identify the item.

DETAILED DESCRIPTION OF EMBODIMENTS ACCORDING TO THE INVENTION

Figure 1:
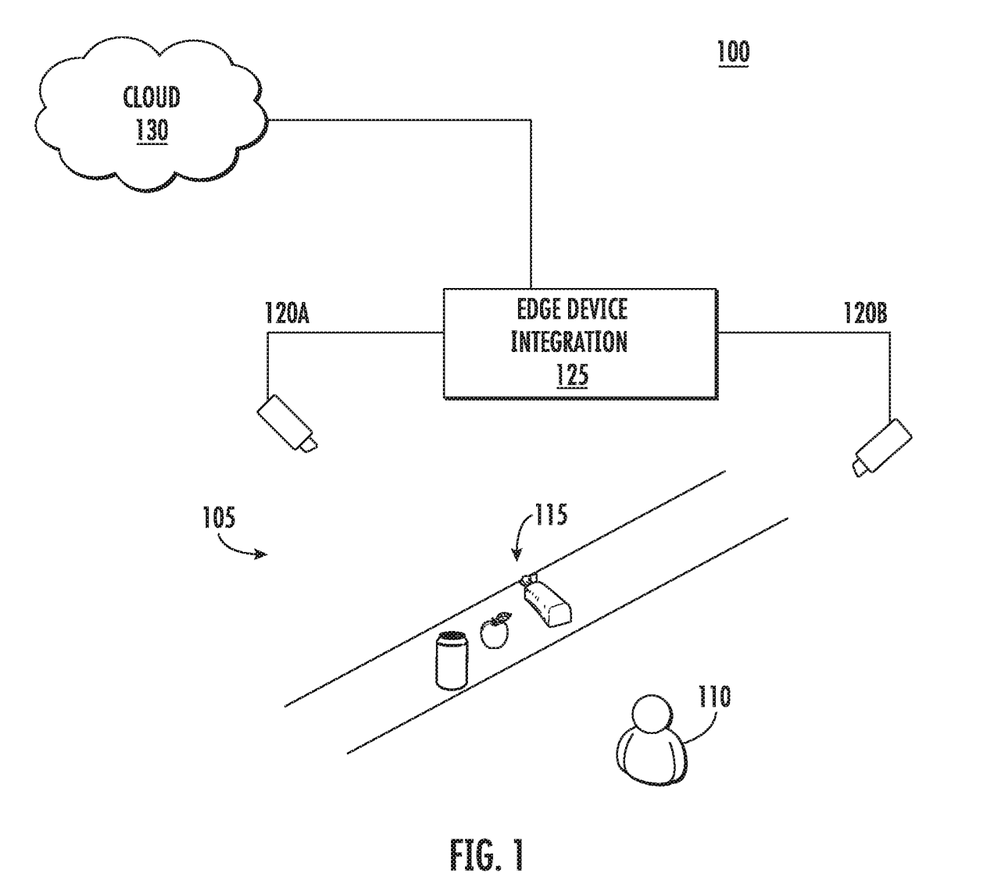
FIG. 1 is a schematic representation of an audited shopping system configured to identify selected items using image data generated by at least one edge device camera using an operating parameter that is selected based on the shape of the item in some embodiments according to the invention.

FIG. 1 is a schematic representation of an audited shopping system 100 configured to identify selected items 115 using image data generated by at least one edge device camera 120A and 120B monitoring shoppers 110 in an environment 105 using an operating parameter that is selected based on the shape of the item 115 selected by the shopper 110 in some embodiments according to the invention. According to FIG. 1, the audited shopping system 100 can be a retail location where shoppers purchase items 115, such as groceries, in what is sometimes referred to as a "frictionless shopping" configuration, whereby the shoppers 110 can purchase the items 115 by the act of selecting the items 115 in the environment 105. Accordingly, in some frictionless shopping" configurations the shopper can make purchases only by selecting the items 115 so that the shopper 110 may depart the retail location without visiting a POS kiosk. In operation the shopper 110 selects the items 115 under monitoring by the plurality of edge device cameras 120A-B which can identify the items 115 and record those items as being purchased by the shopper 110.

As further shown in FIG. 1, the edge device cameras 120 are operatively coupled to an edge device integration system 125 that can coordinate overall operation of the edge device cameras 120A-B to capture images of activity that indicates the purchase of the items 115 such as gestures made towards the items 115 in the environment 105. Accordingly, it will be understood that the retail location may include a number of environments 105 each of which may be monitored by at least one edge device camera 120. As further shown in FIG. 1, a plurality of edge device cameras 120 may be configured to monitor or overlap monitoring of the same items 115. Still further, in some embodiments according to the invention, the environment 105 may include sensors that are configured to provide an indication when an item 115 is lifted off a shelf. Still further the edge device cameras 120A-B may access information indicating which item 115 are stocked in the environments 105 located within the retail location to aid in more accurate identification of the items 115 when purchased. As further shown in FIG. 1, the system 100 is coupled to a cloud computing environment 130 which can operate in conjunction with the system 100 to carry out operations other than those described herein associated with the edge device cameras 120.

As appreciated by the present inventors, the edge device cameras 120 can generate relatively high quality images so that the selected items 115 can be recognized by the system 100 and placed in the shoppers 110 virtual basket. Generating high quality images, however, may place excessive bandwidth demands on the network deployed in the environment 105 to the extent that performance may not be guaranteed as multiple shoppers 110 are monitored and image data is generated in response to detected activity that indicates a purchase. Accordingly, in some embodiments according to the present invention, the edge device cameras 120 can normally use a first operating parameter that generates less image data to reduce the size of image data transfers may otherwise overly stress the network as images are processed to detect purchase activity and record purchases.

As further appreciated by the present inventors, however, the relatively low image data generated by the first operating parameter may not be sufficient to identify all items 115. In particular, the items 115 may come in a variety of shapes, types, materials, and surface finishes which may make it difficult to accurately identify the items 115 using the low image data. Accordingly, in some embodiments according to the invention, when the edge device camera 120 detects activity that indicates a purchase, the edge device camera 120 can use the smaller image data (generated using the first operating parameter) to determine the shape of the item 115, without identifying the item 115. If the determined shape of the item 115 is such that it may limit the accuracy of identifying the item 115, then the edge device camera 120A can capture second (greater) image data using a second operating parameter to provide more image data so that the item 115 can be accurately identified.

Accordingly, as appreciated by the present inventors, the system 100 can utilize less image data to detect and identify items to reduce network bandwidth requirements associated with operation of the frictionless shopping configuration and generate additional image data when identification of the item 115 may be required. In some embodiments, the shape of the item 115 may render it difficult to identify using image data that is relatively low. For example, cylindrical or spherical shaped items 115 may be difficult to identify due to reflections or complex reflections from the surface. Accordingly in some embodiments, if the item 115 has a cylindrical or spherical shape, the edge device cameras 120 may be switched to capture image data using an operating parameter that generates more image data. In some embodiments, if the item 115 has a shape associated with metallic surfaces, the edge device cameras 120 may be switched to capture image data using an operating parameter that generates more image data. In some embodiments, if the item 115 has a shape associated with a glossy surface finish, the edge device cameras 120 may be switched to capture image data using an operating parameter that generates more image data. In some embodiments, if the item 115 has a shape associated with an organic product having a reflective surface, such as particular types of fruits, the edge device cameras 120 may be switched to capture image data using an operating parameter that generates more image data. In some embodiments, other shapes may be used to switch to an operating parameter that generates more image data.

As used herein, an edge device, such as an edge device camera 120, is a type of networked device that operates near the boundary between a locally administered network, such as a LAN, and a wide area network or the Internet. Moreover, the edge device camera 120 can operate withing the LAN in order to carry out the operations described herein to operate the cameras with relatively low lag time, processing the images to detect activity, determine the shapes of the items 115 captured in the image data, re-program the cameras with the operating parameter, and to identify the items 115 at a speed sufficient to avoid missed activity and inaccurate item 115 identification in real-time.

Figure 2:
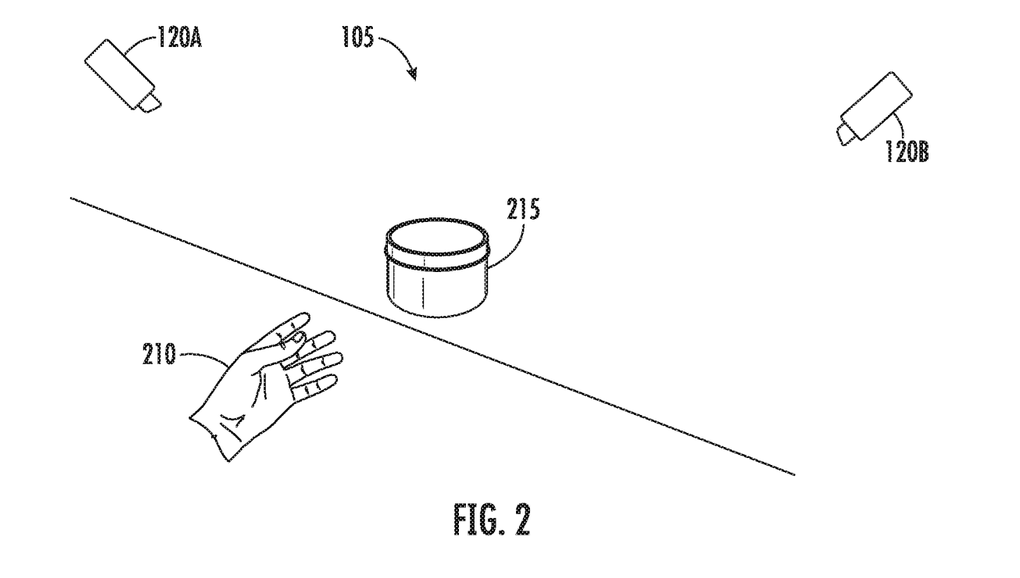
FIG. 2 is a schematic representation of a shopper reaching for an item detected by at least one of the plurality of edge device cameras to generate image data for item identification using different operating parameters responsive to determining that the shape of the item limits an accurate identification of the item in some embodiments according to the invention.

FIG. 2 is a schematic representation of a shopper 210 reaching for an item 215 detected by the plurality of edge device cameras 120A-B to generate image data for item identification using different operating parameters responsive to determining that the shape of the item 215 limits an accurate identification of the item 215 in some embodiments according to the invention. According to FIG. 2, the item 215 is located in the environment 105 within view of the plurality of edge device cameras 120. In operation, the plurality of edge device cameras 120 monitor activities of the shopper 210 and can recognize when the shopper 210 makes a gesture that indicates that the item 215 is to be purchased. For example, in some embodiments according to the invention, the edge device cameras 120 can recognize when the shopper 110 reaches 210 toward the item 215.

Although the present embodiment is described herein with reference to the shopper 110 reaching toward the item 215 as an indication of a purchase, it will be understood that any gesture or activity may trigger an indication that the item 215 is to be purchased by the shopper 210. For example, in some embodiments according to the invention, the edge device cameras 120 can recognize when the shopper 110 looks in the direction of the item 215 for more than a certain time as an indication that the item 215 is to be purchased (or may be purchased). Accordingly, when the edge device cameras 120 recognize that the shopper 110 has made a gesture that indicates the purchase of the item 215, the edge device cameras 120 can capture an image of the item 215 for processing.

Still further, in some embodiments according to the invention, the edge device camera 120 operates using a first operating parameter to when capturing the image data of the item 215. It will be understood that in some embodiments according to the invention, the first operating parameter can be an operating parameter of the edge device camera 120 that generates relatively low quality image data. For example, low quality image data can be image data which is relatively small so that less image data is available for processing. In some embodiments according to the invention, the first operating parameter can be a first frame rate that generates relatively few frames per second when the item 215 in the grasp in the shopper 210 hand. In still further embodiments according the invention, the first operating parameter can be a first resolution of the edge device camera 120 that degenerates relatively low resolution images. In some embodiments according to the invention, the first operating parameter can enable the edge device camera to processing image data from only one camera. In each embodiment, it will be understood that the first operating parameter operates the edge device camera to generate image data of the item 215 that is less than a second operating parameter. It will be understood that the term "lower image quality" or "low image quality" or the like is defined relative to "higher image quality", "high image quality" or the like based on the characteristic that the higher quality images are based on additional image data relative to the image data used to generate the lower quality images.

Figure 3:
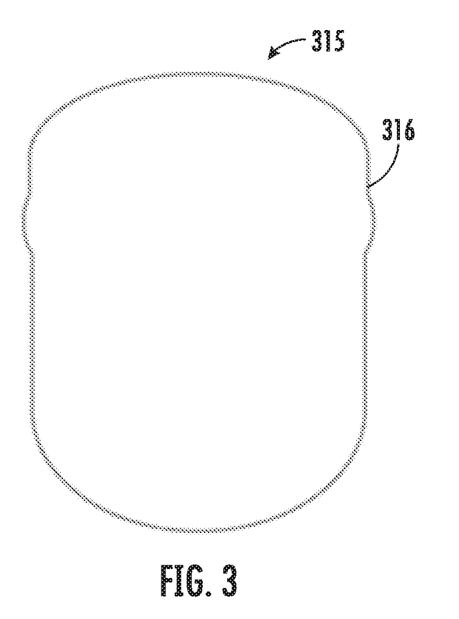
FIG. 3 is a schematic representation of an image showing the shape of the item in FIG. 2, generated by at least one of the plurality of edge device cameras operating at the first operating parameter in some embodiments according to the invention.

FIG. 3 is a schematic representation of an image showing a shape 316 of an item 315 in FIGS. 2, generated by at least one of the plurality of edge device cameras 120A-B operating using the first operating parameter in some embodiments according to the invention. According to FIG. 3, the shape 316 is determined by processing the image data generated from the image captured by the edge device camera 120A using the first operating parameter, such as a low frame rate. In some embodiments according to the invention, the shape 316 is determined so that the edge device camera 120A can quickly determine whether the item 315 may be difficult to identify using the relatively low image quality generated using the first operating parameter because of some characteristic of the item 315. For example, if the shape 316 indicates the item 315 may be readily identified, then the edge device camera 120A may identify the item 315 using the image data generated using the first operating parameter. If, however, the shape 316 indicates the item 315 may be not be readily identified using the lower quality image data, then the edge device camera 120 may operate using the second operating parameter to generate a higher quality image that includes more image data than the first image data.

Figure 4:
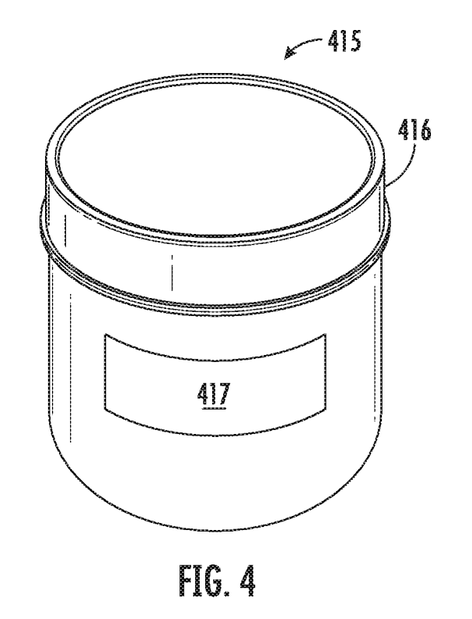
FIG. 4 is a schematic representation of the an image showing the item in FIG. 2, generated by at least one of the plurality of edge device cameras operating at the second operating parameter to provide an improved image of the item for identification based on more image data than used to generate the image of the shape in FIG. 3 in some embodiments according to the invention.

FIG. 4 is a schematic representation of a higher quality image 416 showing the item 315 in FIG. 2, generated by at least one of the plurality of edge device cameras 120A-B operating using the second operating parameter to provide an improved image of the item 315 for identification based on more image data than used to generate the image of the shape 316 in FIG. 3 in some embodiments according to the invention. According to FIG. 4, the edge device camera 120 generates higher quality image data in response to the determination that the shape 316 is such that the item 315 may not be accurately identified. Accordingly, the edge device camera 120A can switch to the second operating parameter to generate the higher quality image of the item 315.

It will be understood that the higher quality image shown in FIG. 4 includes more image data than that generated by the edge device camera 120 operating at the first operating parameter. As further shown in FIG. 4, the image of the item 315 shows additional detail which can be used to more accurately identify the item 315. For example, the image 416 of the item 315 can also include a clear representation of a label 417 that can be used to further aid in the identification of the item 315.

Accordingly, in some embodiments according to the invention, the edge device camera 120 can operate at the first operating parameter in many situations to generate relatively less image data which may be sufficient to identify most items 315 whereas a second operating parameter can be used when the item 315 has a shape 316 that is indicative of products that may be difficult to accurately identify, whereupon the edge device camera 120 can operate at the second operating parameter to generate higher quality images that include more image data. Accordingly, the two different operating parameters of the edge device camera 120 can be used to improve identification of the item 315 while also generating less data in order to preserve network bandwidth.

Figure 5:
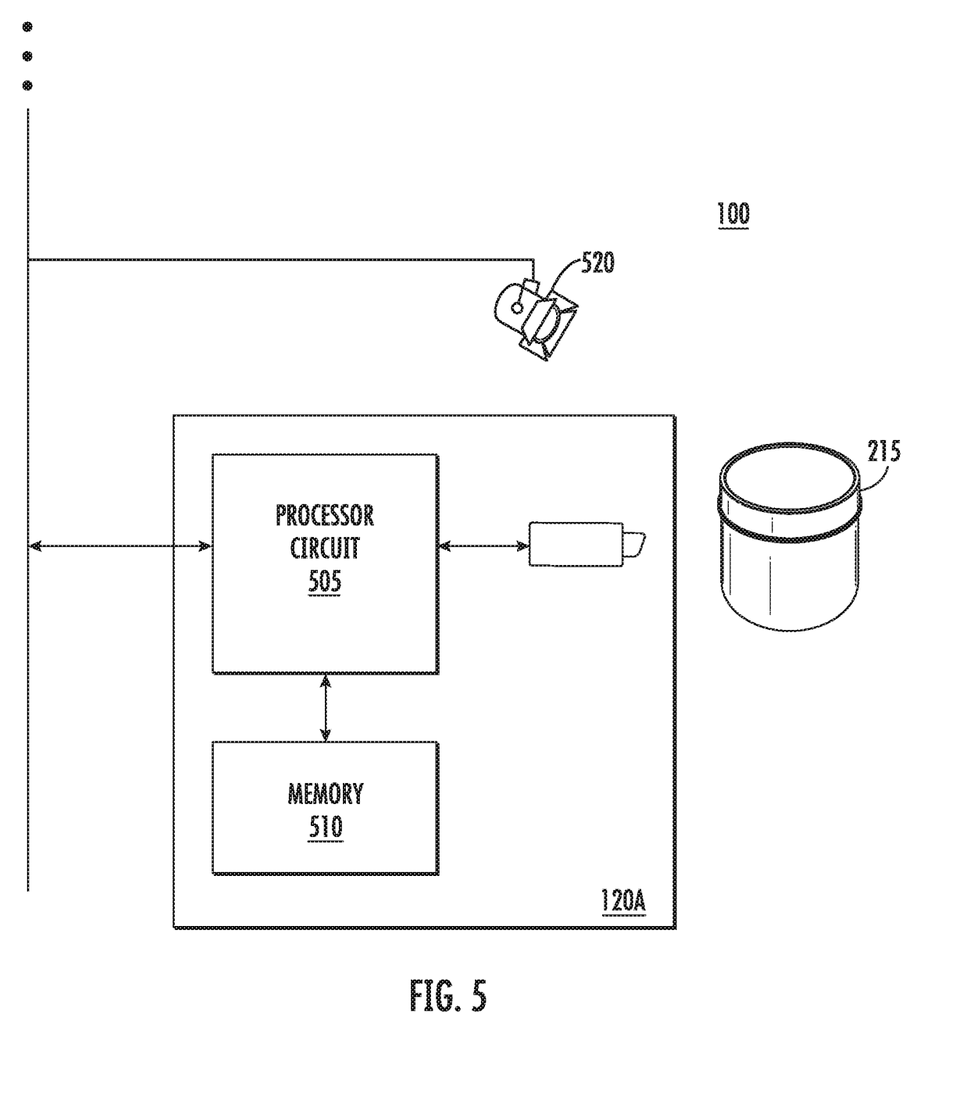
FIG. 5 is a schematic representation of the edge device camera shown in FIGS. 1-2 including a processor circuit closely operatively coupled to the camera to generate the image data used to determine the shape of the item and to identify the item using instructions stored in the memory to select the operating parameter for the camera to generate the images of the item in some embodiments according to the invention.

FIG. 5 is a schematic representation of the edge device camera 120 shown in FIGS. 1-2 including a processor circuit 505 closely operatively coupled to the camera to generate the image data used to determine the shape of the item 316 and to identify the item 315 using instructions stored in a memory 510 to select the desired operating parameter for the camera in some embodiments according to the invention. According to FIG. 5, the edge device camera 120A can include the processor circuit 505 that is closely operatively coupled to the camera and to the memory 510. The edge device camera 120A is configured to operate the camera using the desired operating parameters to capture image data of the item 315 to detect gestures made by the shoppers 110 as well as configured to capture images of the item 315 used for item identification and shape determination.

Accordingly, the processor circuit 505 can operate the camera in real-time and further is configured for image processing operations to detect the gestures made by the shoppers 110 as well as to process the image data generated by operation of the camera. Moreover, the processor circuit 505 is configured with sufficient local resources, including the memory 510, to process the image data generated by the camera, without access to devices outside the edge device camera 120 such as resources located within the cloud computing environment shown in FIG. 1.

As further shown in FIG. 5, the edge device camera 120 can be coupled to a light 520 via a network 515 by which the processor circuit 505 can control illumination of the item 315. For example, in some embodiments according to the invention, the processor circuit 505 can cause the light 520 to illuminate the item 315 when the processor circuit 505 determines that additional lighting may aid in either the determination of the shape of the object 315 or identification of the item 350.

Figure 6:
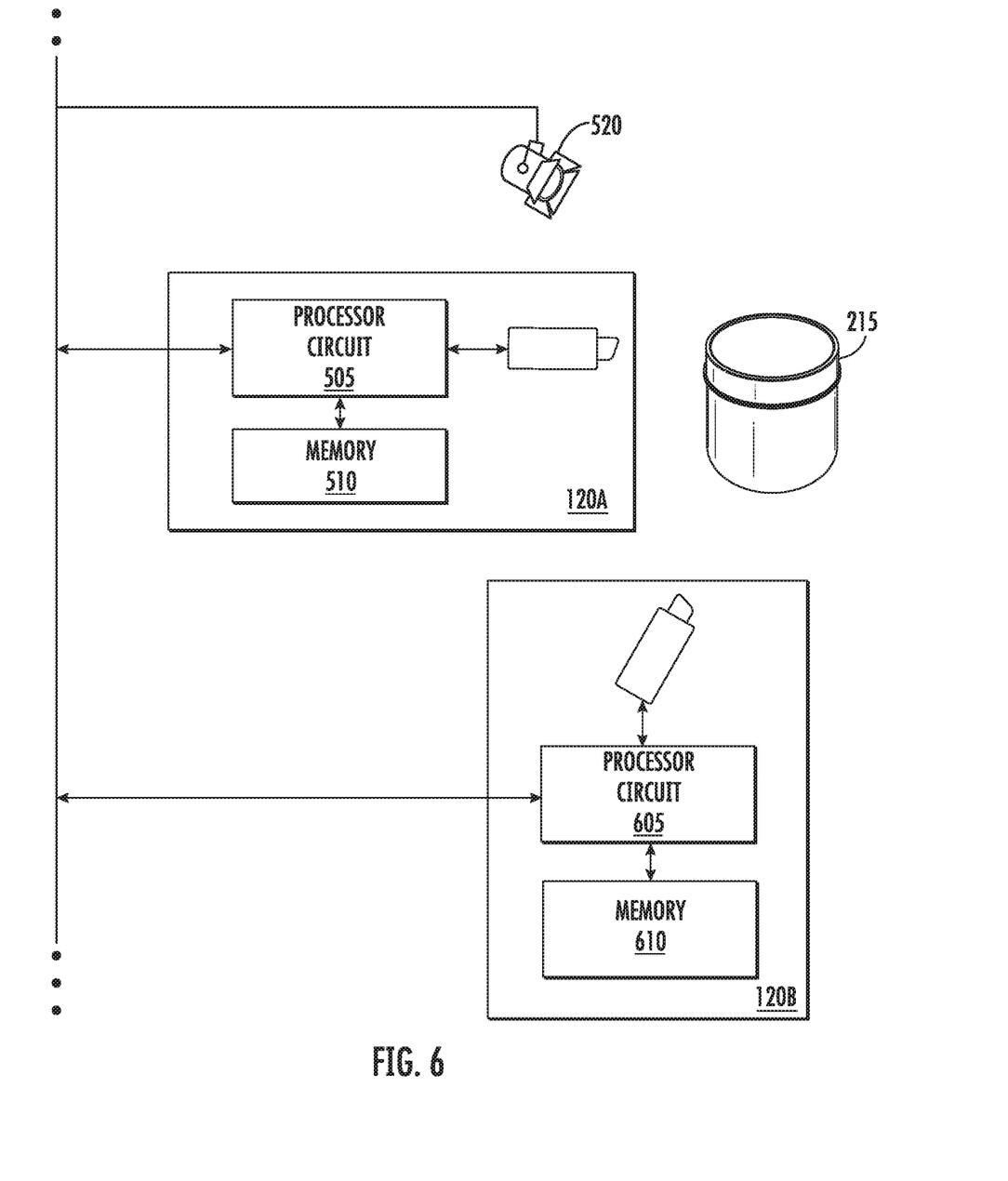
FIG. 6 is a schematic representation of the first and second edge device cameras shown in FIGS. 1-2 each including a processor circuit closely operatively coupled to the respective camera to generate the image data used to determine the shape of the item and to identify the item using instructions stored in the respective memory to select the operating parameter for the respective camera to generate the images of the item in some embodiments according to the invention.

FIG. 6 is a schematic representation of the first and second edge device cameras 120 A-B shown in FIGS. 1-2 each including a processor circuit closely operatively coupled to the respective camera to generate the image data used to determine the shape and identification of the item 315 using instructions stored in the respective memory to select the operating parameter for the respective camera to generate the images of the item 315 in some embodiments according to the invention. According to FIG. 6, the edge device cameras 120-AB are both located within the environment 105 and view of the item 315. In some embodiments according to the invention both the first edge device camera 120A and the second edge device camera 120B can capture images to detect the gestures made by shoppers 110 indicating the purchase of the item 315. In some embodiments according to the invention, both the first edge device camera 120A and the second edge device camera 120B can independently attempt to identify the item 315 as described herein. The independent identifications of the object item 315 can be forwarded to the edge device integration system 125 to coordinate an ultimate determination of the identity of the item 315.

In still further embodiments according to the invention, the first edge device camera 120A can operate using the first operating parameter that enables the processor circuit 505 to capture the image data to determine of the shape of the item 315. Further, when the processor circuit 505 operates using the second operating parameter, the processor circuit 505 can receive image data generated by the second edge device camera 120B so that the additional image data generated by both edge device cameras 120A-B can be processed by the first edge device camera 120A to identify the item 315. Accordingly, in some embodiments according to the invention, the edge device camera 120A can use the second operating parameter to receive image data generated by the another edge device camera 120 for use in identifying the item 315.

Figure 7:
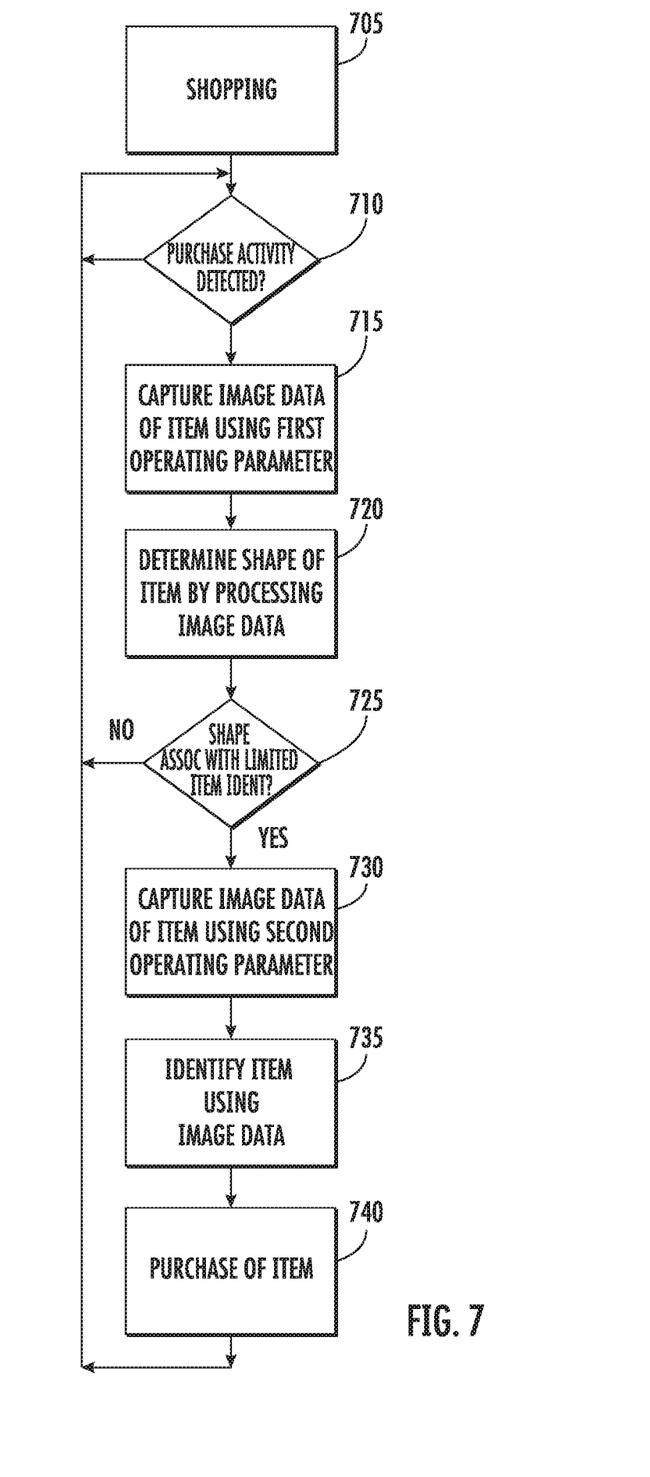
FIG. 7 is a flowchart that illustrates operations of the edge device cameras in the audited shopping system in some embodiments according to the invention.

FIG. 7 is a flowchart that illustrates operations of the edge device cameras in the audited shopping system in some embodiments according to the invention. According to FIG. 7, shopping begins at block 705 wherein the edge device cameras located within the environment 105 begin monitoring the activity of shoppers. When the edge device cameras detect activity that indicates the purchase of an item (block 710) the edge device camera captures first image data of the selected item using the first operating parameter to generate image data that is relatively small in size (block 715). The first image data is used by the edge device camera to determine the shape of the selected item (block 720).

If the shape of the selected item is one where the accurate identification of the item maybe limited (block 725), the edge device camera changes to operation at the second operating parameter to capture further images (block 730). If, however, the shape of the selected item is determined to be one where identification of the object item may not be limited by the relatively low quality first image data generated using the first operating parameter (block 725), the edge device camera uses the first image data to recognize the item and operations continue by further monitoring the activities of the shoppers (block 710).

Once the edge device camera is programmed to operate using the second operating parameter, the edge device camera captures second image data of the selected item to generate additional image data relative to the first image data. The second image data is then processed by the edge device camera to identify the selected item (block 735). Once the selected item is identified the edge device camera or edge device integration system 125 can indicate that the selected item has been purchased and is placed into the virtual shopping cart whereupon operations continue by monitoring of the shoppers activity (block 710).

The processor circuits and memories described herein are examples of portions of systems upon which one or more aspects of embodiments of the present invention can be implemented. For example the processor circuits and memories of FIGS. 5 and 6 illustrates a computing system that can be used to perform processor-executable instructions represented by non-transitory processor-readable media to carry out the operations described herein including those illustrated in FIG. 7 in some embodiments according to the invention.

Examples of processor circuit can include logic, one or more components, circuits (e.g., modules), or mechanisms. Circuits are tangible entities configured or programmed to perform certain operations. In an example, processor circuits can be arranged (e.g., internally or with respect to external entities such as other circuits) in a specified manner. In an example, one or more processor circuits can be configured by software (e.g., instructions, an application portion, or an application) as a circuit that operates to perform certain operations as described herein. In an example, the software can reside (1) on a non-transitory machine readable medium (such as a memory) or (2) in a transmission signal.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor circuit, for example, to constitute a particular circuit at one instance of time and to constitute a different circuit at a different instance of time.

In an example, processor circuits can provide information to, and receive information from, other circuits. In this example, the processor circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one processor circuit can perform an operation and store the output of that operation in a memory device to which it is communicatively coupled. A further processor circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processor circuits executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

Some of the systems described herein, such as the edge device integration system 125 can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In a networked deployment, the system can operate in the capacity of either a server or a client machine in server-client network environments. In an example, processor circuit can act as a peer machine in peer-to-peer (or other distributed) network environments. The processor circuit can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single processor circuit is illustrated, the term "machine" shall also be taken to include any collection of machines that individually or jointly execute a set (or multiple sets) of instructions to perform any one or more of the methodologies discussed herein.

The machine readable medium described herein can include a single medium or multiple media (e.g., a local memory closely coupled to the processor circuit, a centralized or distributed database, and/or associated caches and servers) that configured to store the one or more instructions. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions can further be transmitted or received over a communications network using a transmission medium via the network interface device utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A method of identifying an item as part of audited shopping, the method comprising:
   operating an edge device camera using a first operating parameter;
   detecting activity indicating a purchase of an item with view of the edge device camera;
      capture first image data for the item responsive to detecting the activity;
   processing the first image data to determine a shape of the item as viewed by the edge device camera;
      operating the edge device camera using a second operating parameter to capture second image data for the item that is greater than the first image data, responsive to determining that the shape of the item limits an accurate identification of the item using the first image data;
      processing the second image data to identify the item to provide an identified item; and
      operating the edge device camera using the first operating parameter.

2. The method of claim 1 wherein the first operating parameter comprises a first frame rate for the edge device camera and the second operating parameter comprises a second frame rate for the edge device camera that generates more image data than the first frame rate over a time interval.

3. The method of claim 1 wherein the first operating parameter comprises a first image sensor resolution setting for the edge device camera and the second operating parameter comprises a second image sensor resolution setting for the edge device camera that is greater than the first image sensor resolution setting.

4. The method of claim 1 wherein the edge device camera comprises a first edge device camera and the first operating parameter comprises a first image processing mode configured to process image data generated only using the first edge device camera; and
   wherein the second operating parameter comprises a second image processing mode configured to process image data generated by the first edge device camera and a second edge device camera using the first edge device camera.

5. The method of claim 1 further comprising:
   illuminating the item before operating the edge device camera using the second operating parameter.

6. The method of claim 1 wherein determining that the shape of the item limits the accurate identification of the item comprises determining that the shape of the item is associated with a material using the edge device camera.

7. The method of claim 1 wherein determining that the shape of the item limits the accurate identification of the item comprises determining that the shape of the item is cylindrical or spherical using the edge device camera.

8. The method of claim 1 wherein determining that the shape of the item limits the accurate identification of the item comprises determining that the shape of the item is associated with items having a surface that is metallic using the edge device camera.

9. The method of claim 1 wherein determining that the shape of the item limits the accurate identification of the item comprises determining that the shape of the item is associated with items having a surface that is a gloss finish using the edge device camera.

10. The method of claim 1 wherein determining that the shape of the item limits the accurate identification of the item comprises determining that the shape of the item indicates that the item is an organic item.

11. The method of claim 1 further comprising:
    indicating the identified item as a purchased item.

12. The method of claim 1 wherein operating the edge device camera using the first operating parameter comprising transmitting a plurality of images captured using the first operating parameter to a remote cloud-based system, wherein the plurality of images captured at the first operating parameter requires less bandwidth to transmit to the remote cloud-based system than an equal number of the plurality of images captured at the second operating parameter.

13. An audited shopping system configured to identify an item, the system comprising:
    an edge device camera positioned in-store and configured to capture images of an item, responsive to detecting activity indicating a purchase of the item; and
    a processor circuit that is operatively closely-coupled to the edge device camera and configured to operate the edge device camera using a first operating parameter to capture first image data of the item during the activity and configured to process the first image data to determine a shape of the item as viewed by the edge device camera to determine whether the shape of the item limits an accurate identification of the item from the first image data;
    wherein the processor circuit is configured to operate the edge device camera using a second operating parameter to capture second image data of the item during the activity, the second image data being greater than the first image data, responsive to determining that the shape of the item limits the accurate identification of the item from the first image data;
    wherein the processor circuit is configured to process the second image data to identify the item to provide an identified item; and
    wherein the processor circuit is configured to operate the edge device camera using the first operating parameter.

14. The system of claim 13 wherein the first operating parameter comprises a first frame rate for the edge device camera and the second operating parameter comprises a second frame rate for the edge device camera that generates more image data than the first frame rate over a time interval.

15. The system of claim 13 wherein the first operating parameter comprises a first image sensor resolution setting for the edge device camera and the second operating parameter comprises a second image sensor resolution setting for the edge device camera that is greater than the first image sensor resolution setting.

16. The system of claim 13 wherein the edge device camera comprises a first edge device camera and the first operating parameter comprises a first image processing mode configured to process image data generated only using the first edge device camera; and
    wherein the second operating parameter comprises a second image processing mode configured to process image data generated by the first edge device camera and a second edge device camera using the first edge device camera.

17. The system of claim 13 further comprising:
an illumination device operatively coupled to the processor circuit and positioned to illuminate the item before operating the edge device camera using the second operating parameter.

18. The system of claim 13 wherein the processor circuit is configured to determine that the shape of the item is associated with a material using the edge device camera.

19. The system of claim 13 wherein the processor circuit is configured to determine that the shape of the item is cylindrical or spherical using the edge device camera.

20. The system of claim 13 wherein the processor circuit is configured to determine that the shape of the item is associated with items having a surface that is metallic using the edge device camera.

* * * * *

UNITED STATES PATENT AND TRADEMARK OFFICE
CERTIFICATE OF CORRECTION

| | |
|---|---|
| PATENT NO. | : 11,182,632 B1 |
| APPLICATION NO. | : 17/002612 |
| DATED | : November 23, 2021 |
| INVENTOR(S) | : Johnson et al. |

It is certified that error appears in the above-identified patent and that said Letters Patent is hereby corrected as shown below:

On the Title Page

(73) Assignee: Please correct Assignee to read:
-- Toshiba Global Commerce Solutions Holdings Corporation (JP) --

Signed and Sealed this
Nineteenth Day of April, 2022

*Katherine Kelly Vidal*

Katherine Kelly Vidal
*Director of the United States Patent and Trademark Office*